Dec. 4, 1962  C. N. STEWART  3,066,973
CAR VISOR
Filed Jan. 23, 1961
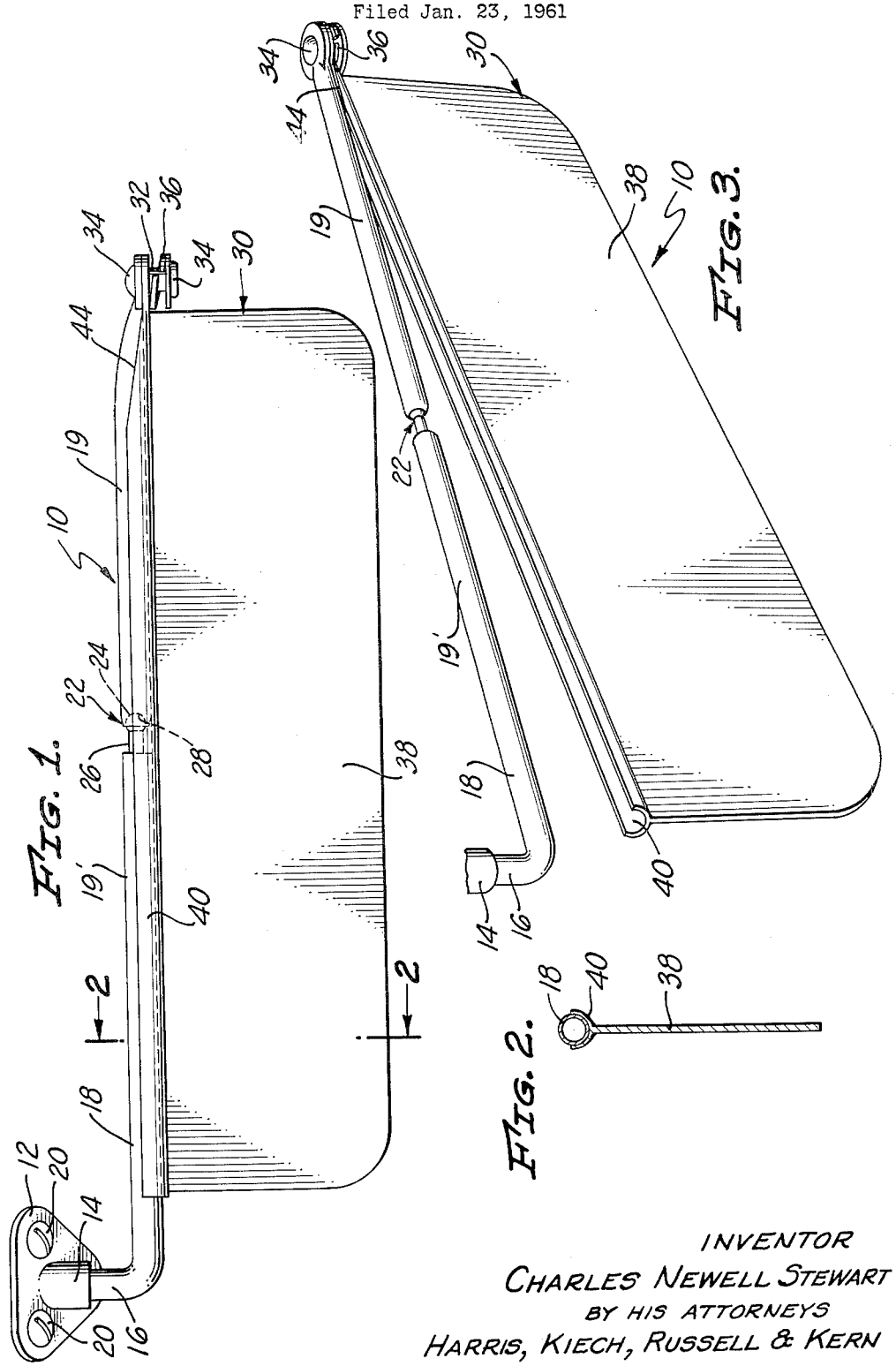
INVENTOR
CHARLES NEWELL STEWART
BY HIS ATTORNEYS
HARRIS, KIECH, RUSSELL & KERN

United States Patent Office 3,066,973
Patented Dec. 4, 1962

3,066,973
CAR VISOR
Charles Newell Stewart, 6101 Carpenter Ave.,
North Hollywood, Calif.
Filed Jan. 23, 1961, Ser. No. 84,012
5 Claims. (Cl. 296—97)

This invention relates to improvements in motor vehicle glare preventing means or visor devices.

It is an object of the present invention to provide a readily shiftable mounted visor device with an improved means for facilitating positioning of the visor member with greater ease and control than is possible with the mechanisms now commonly used. A further object of the invention is to provide a visor device which has a simple and rugged construction and which may be easily and quickly installed in an automobile. A further object of the invention is to provide a visor device having a construction which permits the visor member to be placed in positions normally not attainable with conventional construction. A further object is to provide an improved visor device of a design that permits positioning of the visor member to the right of the driver if desired.

The visor device of the invention is provided with a normally horizontally disposed primary arm which is movably held at its inner end in a bracket for fastening to the automobile. A portion of the primary arm in the design of the invention is capable of rotational movement about its longitudinal axis. A visor member is pivotally held to the outer end of the primary arm about an axis perpendicular to the longitudinal axis of the primary arm. The visor member, generally rectangular, has a grooved longitudinal edge. Means associated with the pivot connecting the visor member and the primary arm urges the visor member and the primary arm together. The latter means preferably takes the form of a spring washer. The spring washer or other resilient means acts with the positioning of the groove of the visor member adjoining the primary arm to bring the visor into locking engagement with the primary arm.

The primary arm, as mentioned before, is provided with a means which permits rotational movement of a portion thereof about its longitudinal axis. Preferably the means takes the form of a ball and socket joint intermediate the ends of the primary arm. It will be appreciated that a ball and socket joint, in addition to providing rotational movement, permits movement of the outer portion of the primary arm out of alignment with the inner portion of that arm. In order to use this latter function of the ball and socket joint, it is necessary that the visor member be moved out of engagement with the primary arm.

Other advantages and objects of the invention will become more apparent to those skilled in the art from the following description of a preferred form of the invention, it being understood that other modifications and changes may be made.

In the drawing:

FIG. 1 is a front elevational view of a preferred form of the car visor device of the invention with a visor member in locked engagement with a primary arm of the device;

FIG. 2 is a cross-sectional view taken along line 2—2 of FIG. 1; and

FIG. 3 is an isometric view of the visor device of FIG. 1 with the visor member moved out of engagement with the primary arm.

As illustrated in FIG. 1, the preferred form of the visor device 10 of the invention is made up of a bracket 12 of conventional design including a sleeve 14 which rotatably holds an upturned end 16 of a normally horizontally disposed primary arm 18. The bracket is held to the car body by screws 20. The primary arm 18 intermediate its ends is provided with means permitting rotational movent of an outer portion 19 of the primary arm about the longitudinal axis of the arm. In the embodiment illustrated, this means takes the form of a ball and socket joint 2 made up of a ball 24 carried at the outer end of a projection 26, which projection preferably is formed integrally with an inner portion 19′ of the primary arm 18. The projection 26 and ball 24, as illustrated, lie along the axis of the primary arm 18. The ball 24 of the ball and socket joint 22 is held within a socket 28 formed in one end of the outer portion 19 of the primary arm 18.

A visor member 30 is pivotally held to the outer end of the arm portion 19 by a pivot pin 32 which has its axis perpendicular to the longitudinal axis of the arm portion 19. Each end of the pivot pin 32 is provided with an enlarged portion 34, which portions serve to retain extensions of the visor member 30 and the arm portion 19 on the pivot pin 32. As best seen in FIG. 1, there is provided a split, spring washer 36 between the lower enlarged portion 34 and the extension of the visor member 30.

The visor member 30 includes a rectangular shield 38 which along one of its longitudinal edges has a trough-like member 40 affixed thereto. When the arm portions 19 and 19′ are in alignment, the spring washer 36 serves with the positioning of the trough-like bar member 40 adjoining the primary arm 18 to bring the trough of the trough-like bar member 40 into locking engagement with the primary arm as illustrated in FIG. 1. Preferably the trough-like member 40 sized with respect to the primary arm 18 to provide a spring-like grasp of the primary arm when the arm is positioned within the trough.

The end portion of the trough-like bar member 40 adjoining the pivot pin 32 gradually tapers from the high side of the trough to the bottom thereof providing cam surfaces 44. These cam surfaces 44 are an important feature of the visor device of the invention as they facilitate the unlocking and moving of the visor member 30 out of alignment with and away from the primary arm 18. The operator of the vehicle grasps the visor member 30, pulling downward to initiate disengagement of the visor member and primary bar 18. With movement of the car visor towards the operator, the outer ends of the aforementioned cam surfaces 44 provided at the top sides of the trough-like bar member 40 engage the underside of the pivot extension of the primary arm 18 and simultaneously compress the spring washer 36. Continued movement of the visor member 30 further compresses the spring washer 36, thus facilitating movement of visor member 30 out of alignment with the primary bar 18. Contrariwise, when the car visor is being moved into locked engagement with the primary arm 18 the cam surface 44 makes easier this movement.

When the car visor 30 is out of locked position with the primary bar 18, it becomes possible to move the outer portion 19 of the arm 18 upwardly or downwardly or sidewise out of alignment with the inner portion 19′ of the arm. This movement provides a degree of flexibility not found in conventional car visor devices.

The component parts of the car visor device of the invention may be made of various materials. For example, the shield 38 may be formed of an opaque material or, if desired fabricated, from a colored, transparent plastic. In one preferred form, the trough-like bar member 40 and the shield 38 are formed integrally of an opaque plastic material. The primary arm 18 may be fabricated of light weight metal tubing as shown in FIG. 2 or, alternatively, the arm may be formed of a solid metal.

Although an exemplary embodiment of the invention has been disclosed herein, for purposes of illustration, it will be understood that various changes, modifications, and substitutions may be incorporated in such embodiment without departing form the spirit of the invention as defined by the claims which follow.

I claim:

1. In a visor device for an automobile, said device having a normally horizontally disposed primary arm movably held at its inner end in a bracket for fastening to the automobile with a portion of the primary arm being capable of rotational movement about its longitudinal axis, the improvement comprising:
   a visor member pivotally held to the outer end of the primary arm about an axis perpendicular to the longitudinal axis of said primary arm, said visor member having a longitudinal edge provided with a groove;
   and means associated with the pivot connecting the visor member and primary arm urging the visor member and primary arm together, said means acting with the positioning of the groove of the visor member adjoining the primary arm to bring said groove into locking engagement with the primary arm.

2. In a visor device for an automobile, said device having a normally horizontally disposed primary arm movably held at its inner end in a bracket for fastening to the automobile with a portion of the primary arm being capable of rotational movement about its longitudinal axis, the improvement comprising:
   a visor member pivotally held to the outer end of the primary arm about an axis perpendicular to the longitudinal axis of said primary arm, said visor member including a shield and a trough-like bar member affixed to a longitudinal edge of the shield;
   and resilient means associated with the pivot connecting the visor member and primary arm urging the visor member and primary arm together, said means serving with positioning of the trough-like bar member adjoining the primary arm to bring the trough of the trough-like bar member into locking engagement with the primary arm.

3. A visor device in accordance with claim 2 wherein the resilient means is a spring washer.

4. In a visor device for an automobile, said device having a normally horizontally disposed primary arm, movably held at its inner end in a bracket for fastening to the automobile, the improvement comprising:
   means disposed along the length of said primary arm permitting rotational movement of a portion of the arm about its longitudinal axis;
   a visor member pivotally held to the outer end of the primary arm about an axis perpendicular to the longitudinal axis of said primary arm, said visor member having a longitudinal edge provided with a groove;
   and means associated with the pivot connecting the visor member and primary arm urging the visor member and primary arm together, said means acting with the positioning of the groove of the visor member adjoining the primary arm to bring said groove into locking engagement with the primary arm.

5. In a visor device for an automobile, said device having a normally horizontally disposed primary arm, movably held at its iner end in a bracket for fastening to the automobile, the improvement comprising:
   a ball and socket joint disposed along the length of said primary arm permitting rotational movement of a portion of the arm about its longitudinal axis;
   a visor member pivotally held to the outer end of the primary arm about an axis perpendicular to the longitudinal axis of said primary arm, said visor member having a longitudinal edge provided with a groove; and
   means associated with the pivot connecting the visor member and primary arm urging the visor member and primary arm together, said means acting with the positioning of the groove of the visor member adjoining the primary arm to bring said groove into locking engagement with the primary arm.

References Cited in the file of this patent

UNITED STATES PATENTS

| 2,673,118 | Phelps | Mar. 23, 1954 |
| 2,727,753 | Johnson et al. | Dec. 20, 1955 |

FOREIGN PATENTS

| 254,562 | Great Britain | July 8, 1926 |